(12) United States Patent
Kurz et al.

(10) Patent No.: US 11,493,891 B2
(45) Date of Patent: Nov. 8, 2022

(54) OPTIMIZATION OF THE MODELING OF PROCESS MODELS

(71) Applicant: Primetals Technologies Germany GmbH, Erlangen (DE)

(72) Inventors: Matthias Kurz, Erlangen (DE); Marco Miele, Erlangen (DE); Alexander Thekale, Erlangen (DE)

(73) Assignee: PRIMETALS TECHNOLOGIES GERMANY GMBH

( * ) Notice: Subject to any disclaimer, the term of this patent is extended or adjusted under 35 U.S.C. 154(b) by 481 days.

(21) Appl. No.: 16/605,868

(22) PCT Filed: Apr. 10, 2018

(86) PCT No.: PCT/EP2018/059105
§ 371 (c)(1),
(2) Date: Oct. 17, 2019

(87) PCT Pub. No.: WO2018/192798
PCT Pub. Date: Oct. 25, 2018

(65) Prior Publication Data
US 2020/0133209 A1 Apr. 30, 2020

(30) Foreign Application Priority Data

Apr. 18, 2017 (EP) .................................... 17166830

(51) Int. Cl.
*G05B 13/04* (2006.01)
*B21B 37/28* (2006.01)
(Continued)

(52) U.S. Cl.
CPC ............ *G05B 13/042* (2013.01); *B21B 37/28* (2013.01); *B21B 37/58* (2013.01); *B23P 17/02* (2013.01)

(58) Field of Classification Search
CPC ....... G05B 13/042; B21B 37/28; B21B 37/58; B23P 17/02
See application file for complete search history.

(56) References Cited

U.S. PATENT DOCUMENTS

| 8,391,998 B2 | 3/2013 | Weinzierl |
| 9,547,290 B2 * | 1/2017 | Dagner .................. B21B 37/58 |

(Continued)

FOREIGN PATENT DOCUMENTS

| CN | 101517497 A | 8/2009 |
| CN | 101535906 A | 9/2009 |

(Continued)

OTHER PUBLICATIONS

International Search Report dated Jun. 19, 2018 in corresponding PCT International Application No. PCT/EP2018/059105.
(Continued)

*Primary Examiner* — Christopher E. Everett
(74) *Attorney, Agent, or Firm* — Ostrolenk Faber LLP

(57) ABSTRACT

A model (8) is based on mathematical-physical equations. The model models the production of a particular output product (1) from at least one input product (2) supplied in each case to an installation in the raw materials industry on the basis of operation (B) of the installation. During production of the output products (1), the installation is controlled by a control device (5) in such a manner that particular actual operation (B) of the installation corresponds as far as possible to particular desired operation (B*) of the installation. The desired operation (B*) is determined by the control device (5) using the model (8) of the installation. The model (8) is parameterized according to a number of first model parameters (P1) for the purpose of modelling the installation. After a multiplicity of output products (1) have been produced in each case, actual sizes (A) of the output products (1) in the particular multiplicity (Continued)

are compared with expected sizes (A') of the output products (1) in the particular multiplicity. On the basis of the comparison, the first model parameters (P1) are newly determined and the model (8) in the control device (5) is newly parameterized according to the new values of the first model parameters (P1). After this time, the desired operation (B*) is determined by the control device (5) using the newly parameterized model (8) of the installation in the raw materials industry. The expected sizes (A') are determined by means of the model (8), wherein the determination of the expected sizes (A') is based on the actual operation (B) of the installation.

18 Claims, 5 Drawing Sheets

(51) Int. Cl.
  *B21B 37/58* (2006.01)
  *B23P 17/02* (2006.01)

(56) References Cited

U.S. PATENT DOCUMENTS

| | | | |
|---|---|---|---|
| 9,751,165 | B2 | 9/2017 | Dagner et al. |
| 9,760,066 | B2 | 9/2017 | Pettersson |
| 10,661,322 | B2 | 5/2020 | Moden |
| 11,053,596 | B2 | 7/2021 | Thekale |
| 2009/0248175 | A1* | 10/2009 | Eguchi .................. G06N 3/08 700/29 |
| 2011/0106512 | A1* | 5/2011 | Hainke .................. G05B 17/02 703/2 |
| 2014/0314922 | A1 | 10/2014 | Meduri |

FOREIGN PATENT DOCUMENTS

| | | |
|---|---|---|
| CN | 102629106 A | 8/2012 |
| CN | 103547384 A | 1/2014 |
| CN | 104267613 A | 1/2015 |
| CN | 104929687 A | 9/2015 |
| CN | 105517720 A | 4/2016 |
| CN | 106295027 A | 1/2017 |
| CN | 106462120 A | 2/2017 |
| EP | 2 422 893 A1 | 2/2012 |
| EP | 2 527 054 A1 | 11/2012 |

OTHER PUBLICATIONS

Written Opinion dated Jun. 19, 2018 in corresponding PCT International Application No. PCT/EP2018/059105.
Extended European Search Report dated Oct. 18, 2017 in corresponding European Patent Application No. 17166830.4.
Jian-guo Cao et al., "VCR and ASR technology for profile and flatness control in hot strip mills," Journal of Central South University of Technology, vol. 15, No. 2, pp. 264-270, Apr. 1, 2008.
Chinese Office Action, dated Jan. 26, 2022, issued in Chinese Patent Application No. 201880026085.7. English translation. Total 12 pages.

* cited by examiner $$P = y(0) - \frac{y\left(-\frac{b}{2}+x'\right) + y\left(\frac{b}{2}-x'\right)}{2}$$

$$K = y(x) \qquad x \in \left[-\frac{b}{2}; \frac{b}{2}\right]$$

US 11,493,891 B2

OPTIMIZATION OF THE MODELING OF PROCESS MODELS

CROSS-REFERENCE TO RELATED APPLICATIONS

The present application is a 35 U.S.C. §§ 371 national phase conversion of PCT/EP2018/059105, filed Apr. 10, 2018, the contents of which are incorporated herein by reference which claims priority of European Patent Application No. 17166830.4, filed Apr. 18, 2017, the contents of which are incorporated by reference herein. The PCT International Application was published in the German language.

FIELD OF THE INVENTION

The present invention is directed to an optimization method for a model,
- wherein the model is based on mathematical-physical equations and models the production of a respective output product from at least one input product supplied in each case to a facility of the raw material industry is dependent on a mode of the facility of the raw material industry,
- wherein the facility of the raw material industry is controlled by a control unit during the production of the output products in such a way that a respective actual mode of the facility of the raw material industry corresponds as much as possible to a respective target mode of the facility of the raw material industry,
- wherein the target mode is ascertained by the control unit using the model of the facility of the raw material industry,
- wherein the model for modeling the facility of the raw material industry is parameterized in accordance with a number of first model parameters.

The present invention is furthermore directed to a computer program which comprises machine code processable by a processing unit.

The present invention is furthermore directed to a processing unit, wherein the processing unit is programmed using such a computer program.

The present invention is furthermore directed to a facility of the raw material industry for producing output products from at least one respective input product supplied in each case to the facility of the raw material industry,
- wherein a control unit setting an actual mode of the facility of the raw material industry is associated with the facility of the raw material industry for controlling the facility of the raw material industry,
- wherein the control unit comprises a model of the facility of the raw material industry based on mathematical-physical equations, under the use of which it ascertains a target mode of the facility of the raw material industry,
- wherein the model models the production of a respective output product from at least one input product supplied in each case to the facility of the raw material industry dependent on a mode of the facility of the raw material industry,
- wherein the model for modeling the facility of the raw material industry can be parameterized in accordance with a number of first model parameters,
- wherein the control unit controls the facility of the raw material industry during the production of the output products in such a way that a respective actual mode of the facility of the raw material industry corresponds as much as possible to the respective target mode of the facility of the raw material industry,
- wherein the control unit is designed as a processing unit as explained above or such a processing unit, which has a data connection to the control unit, is provided in addition to the control unit.

PRIOR ART

In the operation of facilities of the raw material industry, the operation of the facility is often performed in a model-assisted manner. For this purpose, input variables of the input products, from which the output product is to be produced in each case, are supplied to the control unit of the facility of the raw material industry. Furthermore, target variables for the output product are specified to the control unit. The control unit ascertains the associated desired target mode of the facility (setup computation) using a model of the facility of the raw material industry. The model is parameterized using a plurality of characteristic variables (=model parameters) of the facility to be modeled. The characteristic variables can be permanently specified to the control unit or externally supplied. The target mode can be a single state. However, it is generally a sequence of operating states.

In the ideal case, in this way the production of the respective output product results having exactly the desired target variables. However, deviations result in practice. One cause of the deviations is that during the actual production of the respective output product, the actual mode of the facility of the raw material industry never completely corresponds exactly to the target mode. A further cause of the deviations can be that the model by means of which the production of the respective output product was modeled and by means of which the target mode was thus ascertained does not completely correspond to the real facility of the raw material industry.

It is common practice in the prior art that after the production of an output product (i.e., one single output product) in each case actual variables of the respective output product are acquired by the control unit and compared to associated expected variables of the output product and model parameters are re-ascertained on the basis of the comparison. The model is thereupon re-parameterized in accordance with the new values of the model parameters. During the production of the next output product, the ascertainment of the target mode is thus based on the new values of the model parameters. The expected variables of the respective output product are ascertained by the control unit by means of the model. However, the ascertainment of the expected variables is not based on the target mode, but rather the actual mode of the facility of the raw material industry. This procedure is common practice, as already mentioned, and is typically referred to as online adaptation.

Model parameters, in the case of which an unambiguous relationship between cause and effect is relatively simple to recognize, may be optimized by means of the procedure of the prior art. In a cooling line of a hot strip train, one example is the heat transfer from the rolled metal to the coolant medium. However, other model parameters also exist. Their influence on the actual variables of the output products is not readily recognizable and/or is not adapted because of a lack of measurability. For example, profile, contour, and planarity are important target variables in the rolling of flat rolling stock. They are generally specified as target variables to be maintained. In the scope of the pass schedule computation, the pass schedule (=target mode) of the rolling mill is then ascertained, in which the flat rolling stock is to be rolled. The ascertainment of the pass schedule is carried out in such a way that the target variables are maintained.

In the scope of the pass schedule computation, the model modeling the rolling mill is parameterized using a plurality of model parameters. The model parameters have influence on the profile, the contour, and the planarity of the rolling stock after the rolling in the rolling mill. Some of these model parameters are adapted in accordance with the procedure outlined above. Other model parameters are not adapted, however, and also cannot be adapted by means of the procedure outlined above. Examples of such non-adaptable model parameters are the modulus of elasticity and/or the influence caused by the temperature or by wear on the contour and/or the grind of a roller of a rolling stand, in which the flat rolling stock is rolled. Such model parameters are parameterized once in the prior art and maintained thereafter until they are re-specified. Other model parameters for example, the modeling of the flow behavior of the rolling stock in a material flow model, are also generally maintained unchanged.

An optimization method for a model is known from EP 2 527 054 A1, wherein the model is based on mathematical-physical equations and models the production of a respective output product from at least one input product supplied in each case to a facility of the raw material industry dependent on a mode of the facility of the raw material industry. The facility of the raw material industry is controlled by a control unit during the production of the output products in such a way that a respective actual mode of the facility of the raw material industry corresponds as much as possible to a respective target mode of the facility of the raw material industry. The target mode is ascertained by the control unit using the model of the facility of the raw material industry. The model for modeling the facility of the raw material industry is parameterized in accordance with a number of model parameters. After the production of one output product in each case, an actual variable of the output product is compared to an expected variable of the output product. The model parameters are re-ascertained on the basis of the comparison. The model of the control unit is re-parameterized in accordance with the new values of the model parameters. The target mode is ascertained by the control unit from this point in time using the re-parameterized model of the facility of the raw material industry. The expected variables are ascertained by means of the model.

SUMMARY OF THE INVENTION

The object of the present invention is to provide options, by means of which model parameters, the updating and tracking of which is not possible in the prior art, can also be tracked and updated.

The object is achieved by an optimization method having the features disclosed herein. Advantageous embodiments of the optimization method are also disclosed herein.

According to the invention, an optimization method of the type mentioned at the outset is designed such that after the production of a plurality of output products, in each case, actual variables of the output products of the respective plurality are compared to expected variables of the output products of the respective plurality, the first model parameters are re-ascertained on the basis of the comparison and the model of the control unit is re-parameterized in accordance with the new values of the first model parameters, and the target mode is ascertained by the control unit from this point in time using the re-parameterized model of the facility of the raw material industry, the expected variables are ascertained by means of the model, and the ascertainment of the expected variables is based on the actual mode of the facility.

According to the invention, the actual variables and the expected variables of individual output products are thus not used in each case for the re-ascertainment of the first model parameters, but rather the actual variables and the expected variables of a plurality of output products are used in each case.

The number of output products which is included in a plurality of output products can be defined as needed. In some cases, it can be relatively low, for example between 10 and 50. However, the plurality will often be in the three-digit range or even greater, for example in the four-digit range. An optimizer is therefore preferably implemented by the control unit. In this case, the input variables describing input products, the actual mode of the facility of the raw material industry, and the actual variables are each supplied to the optimizer for the re-ascertainment of the first model parameters for the respective plurality of output products. The optimizer then ascertains the first model parameters therefrom. Such optimizers are known per se. For example, reference can be made to gradient methods, SQP methods (SQP=sequential quadratic programming), and genetic algorithms. Other optimizers are also possible. The optimizing is performed in that a target function, into which the first model parameters are incorporated, is optimized according to a predetermined optimization criterion (from the viewpoint of the optimizer). The value of the target function (a scalar) is thus minimized or maximized.

In any case, the first model parameters are incorporated indirectly into the target function, namely in that they parameterize the model and influence the expected variables of the output products via the parameterization of the model, wherein the deviations of the expected variables of the output products from the actual variables of the output products are incorporated into the target function. It is possible that the first model parameters exclusively go into the target function in this manner. Alternatively, it is possible that, in addition to the indirect incorporation into the target function, one, several, or all of the first model parameters also go directly into the target function. In this case, a starting value is known to the optimizer, for example, by corresponding specification, with respect to the respective first model parameter and the deviation of the respective first model parameter from the respective starting value is incorporated into the target function.

The procedure according to the invention is applicable in principle to all model parameters. However, it is preferably only applied to model parameters which cannot be determined in a conventional manner. For model parameters which can be determined in a conventional manner, the pluralities of output products are preferably divided into multiple groups of output products in each case, which each in turn comprise a number of output products. In this case, after the production of one group of output products in each case, the actual variables of the output products of the respective group can be compared to expected variables of the output products of the respective group, a number of second model parameters can be re-ascertained on the basis of the comparison, and as a result the model can be re-parameterized in accordance with the new values of the second model parameters. The first model parameters and the second model parameters are therefore generally unconnected. A model parameter of the model is thus generally either a first model parameter or a second model parameter, but not simultaneously a first model parameter and a second model parameter. However, case designs are also conceivable in which one and the same model parameter is adapted to both types.

The number of output products of the respective group can be significantly lower than the number of output products of the respective plurality. For example, the number of output products of the respective group can be in the one-digit or in the lower two-digit range. In the extreme case, the number of output products per group can even be only 1. This last-mentioned case corresponds, for the second model parameters, to the conventional procedure.

The facility of the raw material industry can be, for example, a rolling mill. In this case, the production of the output product can be the rolling of a flat rolling stock. In this case, it is possible in particular that the actual variables of the output products comprise the profile and/or the contour and/or the planarity of the rolled flat rolling stock.

For example, the first model parameters with respect to at least one roller of a rolling stand through which the flat rolling stock passes can comprise its modulus of elasticity and/or its influence on the contour of the roller caused by the temperature and/or by wear. The modeling of the influence of temperature and/or wear on the contour of the roller can take place in a separate submodel. Such models are known to persons skilled in the art under the term TWM (temperature-wear model). Alternatively or additionally, the first model parameters with respect to at least one rolling stand through which the flat rolling stock passes can parameterize a material flow model, by means of which the material flow of the flat rolling stock in the rolling stand is modeled. The first model parameters, again alternatively or additionally, can also describe an adaptation of input variables of the flat rolling stock. For example, it is generally assumed in the prior art that a flat rolling stock has an ideal contour before the initial rolling in a finishing stand. In practice, however, this is not always the case. For example, an initial contour of the flat rolling stock before the rolling in the rolling stand can be defined in the scope of the model by means of corresponding first model parameters. Furthermore, it is possible, again alternatively or additionally, that the first model parameters comprise the grind of at least one roller of a rolling stand through which the flat rolling stock passes.

If the first model parameters comprise a description of the grind of the roller, the first model parameters for describing the grind of the roller preferably comprise the radius or the diameter of the roller at the position of the respective support point for a plurality of support points along the roller crown of the roller. The actual grind of the roller is thus preferably not described by a contour function using a few functional parameters, but rather by support points, between which interpolation is performed.

In general a target grind of the roller is known to the model. It is therefore possible that a deviation of the grind of the roller from the target grind of the roller is ascertained. In some cases, it can be advantageous if the deviation of the grind from the target grind is associated with a respective grinding machine, by which the grind was applied to the roller. This applies in particular if the grind error is reproducible.

In a similar manner, it can be advantageous in some cases if a thermal grind error is ascertained with evaluation of a time which has passed between a removal of the roller from the rolling stand and the grinding of the roller by means of the grinding machine (as a result thus the time available for the cooling down and cooling off of the roller) and this error is associated with the mentioned time. Systematic errors can thus be taken into consideration, which result because of the circumstance that the grinding of the roller takes place at a different temperature than assumed.

The object is furthermore achieved by a computer program having the features disclosed herein. According to the invention, the processing of the machine code by the processing unit has the effect that the processing unit accepts actual variables of a plurality of output products, which were produced by the facility of the raw material industry from at least one input product in each case, input variables of the associated input products, and the actual modes of the facility of the raw material industry during the production of the output products from the input products from a control unit controlling a facility of the raw material industry, using the input variables of the respective input products and the respective actual mode of the facility of the raw material industry, ascertains expected variables in each case for the output products by means of a model based on mathematical-physical equations and modeling the production of the output products from the input products dependent on the respective actual mode of the facility of the raw material industry, after the production of the plurality of output products, compares the actual variables of the output products of the respective plurality to the expected variables of the output products of the respective plurality and re-ascertains first model parameters on the basis of the comparison, and provides the re-ascertained first model parameters to a control unit controlling the facility of the raw material industry for parameterizing a model implemented in the control unit.

Advantageous embodiments of the computer program substantially correspond to those of the optimization method.

The object is furthermore achieved by a processing unit disclosed herein. According to the invention, the processing unit is programmed using a computer program according to the invention, so that the processing unit executes an optimization method according to the invention.

Similarly to the computer program, advantageous embodiments of the processing unit substantially correspond to those of the optimization method.

The object is furthermore achieved by a facility of the raw material industry for producing multiple pluralities of output products having the features disclosed herein. According to the invention, the control unit is designed as a processing unit according to the invention or a processing unit according to the invention, which has a data connection to the control unit, is provided in addition to the control unit.

The facility of the raw material industry can be in particular a rolling mill. In this case, the production of the output product can be, for example, the rolling of a flat rolling stock.

BRIEF DESCRIPTION OF THE DRAWINGS

The above-described properties, features, and advantages of this invention and the manner in which they are achieved will become clearer and more comprehensible in conjunction with the following description of the exemplary embodiments, which are explained in greater detail in conjunction with the drawings. In the schematic figures.

DESCRIPTION OF THE EMBODIMENTS

Figure 1:
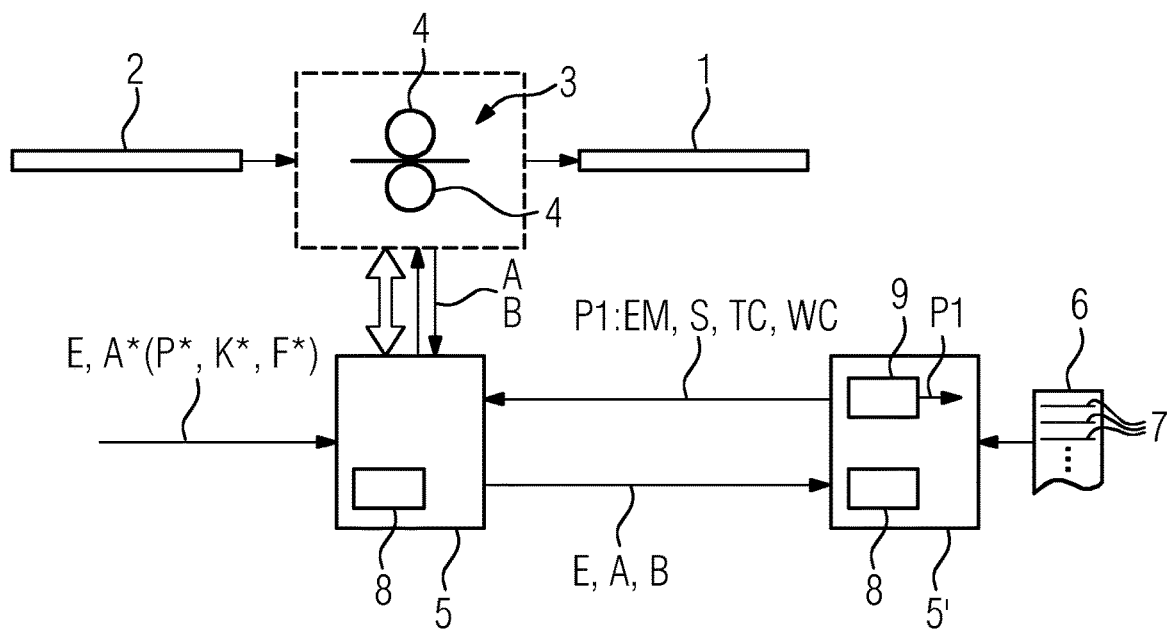
FIG. 1 shows a facility of the raw material industry.

According to FIG. 1, multiple output products 1 are to be produced in succession by means of a facility of the raw material industry. The facility of the raw material industry can be designed, for example, as a facility for producing crude iron. One example of such a facility is a direct reduction facility. It can also be designed as a facility for producing steel. Examples of such facilities are a converter or an LD facility. It can also be designed as a facility for treating a molten steel which is already produced, for example as a vacuum treatment facility. It can also be designed as another facility of the raw material industry, for example as a continuous casting facility. According to the illustration in FIG. 1, the facility of the raw material industry is a rolling mill, in which a flat rolling stock (strip or heavy plate) is rolled. However, this embodiment is disclosed solely by way of example.

At least one input product 2 is supplied in each case to the facility of the raw material industry to produce the respective output product 1. Alternatively, multiple input products 2 can each be supplied to the facility of the raw material industry to produce the respective output product 1. For example, during the production of iron or steel, the various components of the molten iron or the molten steel, respectively, can be considered to be input products. In the case of the embodiment of the facility of the raw material industry as a rolling mill, a rolling stock which is not yet rolled or is only partially rolled is supplied to the rolling mill as an input product 2, which is rolled in the rolling mill. The rolled rolling stock (i.e., the rolling stock after the rolling in the rolling mill) represents the respective output product 1 in this case.

If the facility of the raw material industry is designed as a rolling mill, it comprises at least one rolling stand 3. In this case, the rolling stock passes through the rolling stand 3 in a reversing or non-reversing manner. The rolling mill often comprises multiple rolling stands 3, which the rolling stock passes through sequentially one after another. Each rolling stand 3 comprises rollers 4. Only the working rollers 4 are shown in FIG. 1. However, the rolling stand 3 often comprises further rollers, for example support rollers or support rollers and additionally intermediate rollers. The rolling mill can be designed, for example, for rolling bar-shaped rolling stock, tubular rolling stock, profiled rolling stock, etc. It can also be designed for rolling a flat rolling stock. This case is assumed hereafter. In this case, the production of the respective output product 1 is the rolling of a flat rolling stock.

A control unit 5 is associated with the facility of the raw material industry, by which the facility of the raw material industry is controlled. The control unit 5 can have a data connection to a processing unit 5', for example a laptop. Alternatively, the control unit 5 itself can be designed as such a processing unit 5'. It is differentiated hereafter whether specific measures are executed by the control unit 5 or the processing unit 5'. If necessary, it is noted if the respective measures can also be executed by the respective other unit 5', 5. If the control unit 5 itself is designed as the processing unit 5', the differentiation is meaningless.

The processing unit 5' is designed as a software-programmable processing unit. Its mode of operation is determined by a computer program 6, by use of which the processing unit 5' is programmed. The computer program 6 comprises machine code 7, which is processable by the processing unit 5'. The programming of the processing unit 5' using the computer program 6 or the processing of the machine code 7 causes the processing unit 5' to execute an optimization method, which is explained in greater detail hereafter in conjunction with FIGS. 2 and 4.

Figure 2:
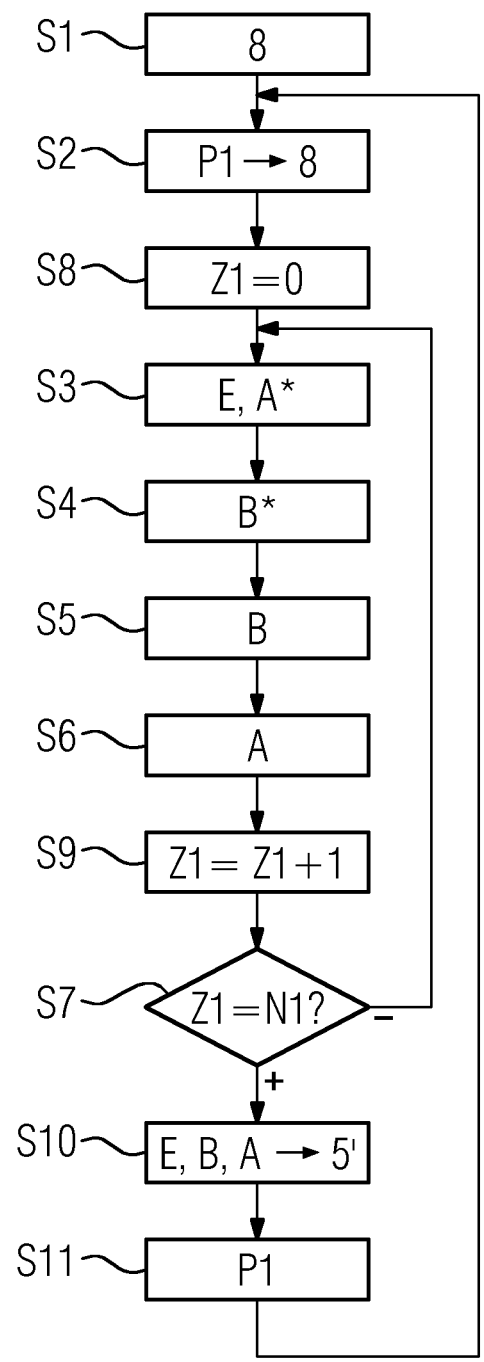
FIG. 2 shows a flow chart.

To control the facility of the raw material industry, the control unit 5 executes the following production method:

Firstly, according to FIG. 2, in a step S1, the control unit 5 implements a model 8 of the facility of the raw material industry. The model 8 is based on mathematical-physical equations. The mathematical-physical equations can comprise, for example, differential equations, in particular partial differential equations, and/or algebraic equations. The model 8 models the production of the respective output product 1 from the respective at least one input product 2 in dependence on an operating state of the facility of the raw material industry. The model 8 as such is known to a person skilled in the art and therefore does not have to be explained in greater detail at this point. For example, in the case of rolling of a flat rolling stock, a person skilled in the art will implement a model 8 which models the forming of the flat rolling stock in the rolling gap of the rolling stand. For this purpose, the model 8 can ascertain, inter alia, for example, the thermal crown and the wear of the rollers 4 of the rolling stands 3 (and/or the contours thereof in general), and can ascertain and take into consideration the force distribution along the crowns of the rollers of the rolling stand, the deflection of the rollers 4 and the flattening thereof on one another and toward the flat rolling stock, the material flow, and the pressure distribution in the rolling gap, the rolling force, the temperature of the flat rolling stock, etc.

The model 8 can be parameterized using first model parameters P1. In a step S2, the control unit 5 therefore parameterizes the model 8 using the first model parameters P1. The first model parameters P1 can be determined as needed. With given target mode B* of the facility of the raw material industry, they have influence on the expected output variables of the respective output product 1 ascertained by means of the model 8 or vice versa with predetermined desired output variables A* of the respective output product 1, they have influence on the associated target mode B* of the facility of the raw material industry. In the case of a rolling mill for rolling a flat rolling stock, the first model parameters P1 can comprise, for example, with respect to at least one roller 4 of the rolling stand 3, its material data, its modulus of elasticity EM, and/or its grind S. Alternatively or additionally, the first model parameters P1 can comprise parameters TC (for thermal crown) and WC (for wear crown), which describe the influence caused by the temperature or by wear on the contour of the roller 4. The corresponding first model parameters P1 are known as such to persons skilled in the art. The first model parameters P1 can also comprise parameters for a material flow model, by means of which the material flow of the flat rolling stock in the rolling stand 3 is modeled. One example of such a parameter for a material flow model is a coefficient of friction of the flat rolling stock on the working rollers of the corresponding rolling stand 3.

In a step S3, the control unit 5 accepts input variables E and target output variables A*. The input variables E are related to the input product 2 or the input products 2, respectively. These are actual variables ascertained metrologically or in a model-assisted manner. The target output variables A* are related to the associated output product 1. For example, during the rolling of a flat rolling stock, the input variables E for the input product 2 can specify the width, the thickness, the temperature, and the chemical composition of the flat rolling stock. The target output variables A* can specify, for example, for the output product 1, the desired width, the desired thickness, the desired profile P*, the desired contour K*, the desired planarity F*, etc. It is possible, alternatively or additionally to the above-mentioned first model parameters P1, that the first model parameters P1 comprise parameters which describe an adaptation of the input variables E of the flat rolling stock. For example, the rolling stock running into the rolling stand 3 can be associated with a specific profile or a specific contour in the scope of the model 8 or a temperature distribution can be modified (in up to three dimensions) on the basis of the first model parameters P1.

Figure 3:
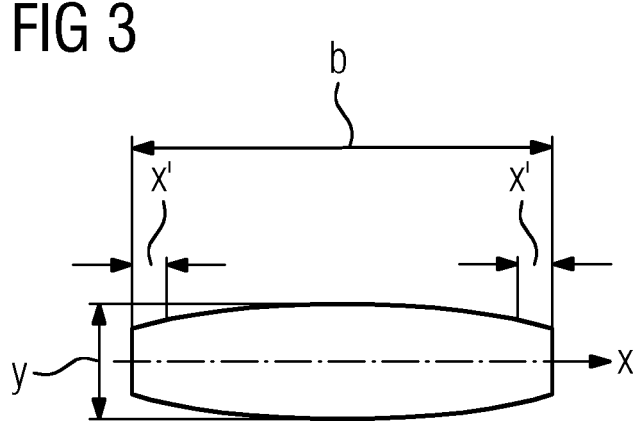
FIG. 3 shows a flat rolling stock in section.

The profile P of a flat rolling stock is generally solely a numeric value (scalar). If, corresponding to the illustration in FIG. 3, y denotes the thickness of the flat rolling stock, b denotes the width of the flat rolling stock, and x denotes a position in the width direction of the flat rolling stock, wherein x=0, viewed in the width direction of the flat rolling stock, is the middle of the flat rolling stock, the profile P is defined by $$P(x')=y(0)-(y(-b/2+x')+(y(b/2-x'))/2 \quad (1)$$

In this case, x' is a distance (arbitrarily selectable in principle) from the lateral edges of the flat rolling stock. The distance x' often has a value of 25 mm or 40 mm in practice. However, other values are also possible.

In contrast thereto, the contour K denotes the thickness curve, resolved in position over the width b of the flat rolling stock, i.e., the function curve y(x), wherein x assumes arbitrary values from –b/2 to b/2 or—in the case of the definition of support points—can at least assume multiple different values. The number of support points in the last-mentioned case is generally at least five, often at least ten. The planarity F describes the inner tension states which prevail in the flat rolling stock. It is defined resolved in position over the width b of the flat rolling stock, similarly to the contour K. The position resolution can correspond to the position resolution of the contour K.

Based on the input variables E and the target output variables A*, the control unit 5 ascertains, in a step S4, using the model 8, the associated target mode B* of the facility of the raw material industry. The target mode B* is ascertained by the control unit 5 in such a way that in the scope of the possible, the output product 1 has the desired target output variables A*. For example, the pass schedule computation can be performed for the rolling of a flat rolling stock, i.e., the ascertainment of the respective pass reductions, the rolling speeds, the stand positions, the setting of roller displacements, roller interleaving, roller rake, roller cooling, etc.

The control unit 5 then controls, in a step S5, the facility of the raw material industry during the production of the respective output product 1. The control is performed in such a way that a respective actual mode B of the facility of the raw material industry corresponds as much as possible to the previously ascertained target mode B*. During the production, the control unit 5 acquires the respective actual mode B. Furthermore, the control unit 5 acquires, in a step S6, actual variables A of the respective produced output product 1. The actual variables A correspond in the meaning thereof to the target output variables A*. However, these are the associated actual values. In particular during the rolling of a flat rolling stock, the actual variables A of the output products 1 can comprise, for example, the profile P and/or the contour K and/or the planarity F of the rolled flat rolling stock.

As previously explained, the operation of the control unit 5 and thus of the facility of the raw material industry is thus also performed as in the prior art. In addition, however, a step S7 is provided. In step S7, the control unit 5 checks whether it has passed through steps S3 to S6 sufficiently often, i.e., whether a plurality of output products 1 has been produced in the facility of the raw material industry. For example, the control unit 5, in a step S8, which is executed before step S3, can set a counter Z1 to a starting value (for example 0) and increase the counter Z1 by 1 in a step S9 after each pass through steps S3 to S6. In this case, the control unit 5 can check in step S7 whether the counter Z1 has reached an end value N1. The end value N1 is suitably determined. In any case, it is greater than 1. It can even be substantially greater than 1, for example can have a value of 100 or more.

If the plurality of output products 1 has not yet been produced, the control unit 5 returns to step S3. A further output product 1 is thus produced. In contrast, if the plurality of output products 1 has been produced, the control unit 5 passes to a step S10. In step S10, the control unit 5 transmits the actual variables A of the output products 1, the input variables E of the associated input products 2, and the associated actual modes B to the processing unit 5'. In a step S11, the control unit 5 accepts new first model parameters P1 from the processing unit 5'. The control unit 5 then goes back to step S2. The control unit 5 thus re-parameterizes the model 8 in accordance with the new values of the first model parameters P1 upon the renewed execution of step S2. A further plurality of output products 1 is then again produced in the facility of the raw material industry. However, the re-parameterized model 8 is used in this case in the scope of step S4 to ascertain the target mode B*. A renewed re-ascertainment of the first model parameters P1 and a renewed parameterization of the model 8 then take place.

Figure 4:
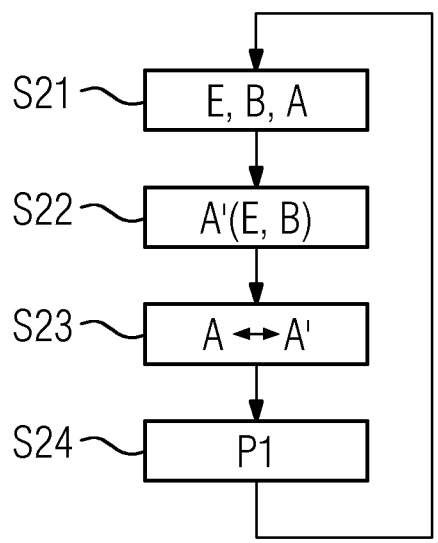
FIG. 4 shows a flow chart.

For the ascertainment of the new first model parameters P1, the processing unit 5' implements the following procedure according to FIG. 4:

It accepts, in a step S21, the actual variables A of the output products 1, the input variables E of the associated input products 2, and the associated actual modes B from the control unit 5. In a step S22, the processing unit 5' ascertains variables A' expected for the respective output products 1. For this purpose, the processing unit 5' supplies the input parameters E of the associated input product 2 or the associated input products 2, respectively, and the actual mode B to the model 8 for the respective output product 1. This can be possible, for example, because the processing unit 5' has access to the model 8 used by the control unit 5. Alternatively, it is possible that the same model 8 is implemented within the processing unit 5'.

Using the input variables E of the associated input products 2 and the associated actual modes B, the processing unit 5' thus ascertains the associated expected variables A' by means of the model 8. The processing unit 5' executes step S22 for all output products 1 of the respective plurality, i.e., for example, for the N1 output products 1.

In a step S23, the processing unit 5' compares the actual variables A and the expected variables A' ascertained in step S22 for the plurality of output products 1. On the basis of the comparison, the processing unit 5' ascertains optimized first model parameters P1 in a step S24. The processing unit 5' thus ascertains the first model parameters P1 in such a way that a better correspondence of the expected variables A' to the actual variables A results.

As a criterion which is used for the judgment of the quality of the optimized first model parameters P1, in the case of the rolling of a flat rolling stock, for example, the weighted or unweighted deviation of the profile P and/or the contour K and/or the planarity F from the corresponding target variables P*, K*, F* thereof can be used.

To ascertain the optimized first model parameters P1, iterative processing of steps S22 to S24 is possibly required. However, this is of subordinate significance in the scope of the present invention and is therefore not explained in greater detail hereafter.

To implement steps S22 to S24, the processing unit 5' can implement an optimizer 9, for example, in accordance with the illustration in FIG. 1. In this case, the corresponding input variables E, the corresponding actual modes B, and the actual variables A are supplied to the optimizer 9 for the re-ascertainment of the first model parameters P1 for the respective plurality of output products 1. In addition, the expected variables A' can optionally also be supplied to the optimizer 9. In this case, the optimizer 9 ascertains the optimized first operating parameters P1. Typical optimizers are known to those skilled in the art.

As previously explained, the first model parameters P1 are re-ascertained each time N1 output products 1 have been produced in each case. To ascertain the first model parameters P1 on the basis of a respective plurality of output products 1, however, other options are also provided. For example, it is possible that the control unit 5 transmits the input variables E, the actual mode B, and the actual variables A continuously to the processing unit 5' and the processing unit 5' waits until a sufficiently large amount of data is present. It is also possible that, for example, once a day, the data are transmitted from the control unit 5 to the processing unit 5' and then the first model parameters P1 are re-ascertained, independently of how high the number of available data sets is precisely. For example, if it is planned to re-ascertain the first model parameters P1 on the basis of the data of approximately 100 output products 1 in each case, the ascertainment can also be performed if the data of 97, 102, or 110 output products 1 are available. It is also possible, for example in the scope of maintenance work, to connect the processing unit 5' to the control unit 5, then perform the data transfer from the control unit 5 to the processing unit 5', and finally perform the data transfer from the processing unit 5' to the control unit 5. It is also possible to perform the optimization in each case when a corresponding optimization command is specified by an operator. In all of these cases, the optimization of the first model parameters is performed on the basis of the presently available data sets.

Figure 5:
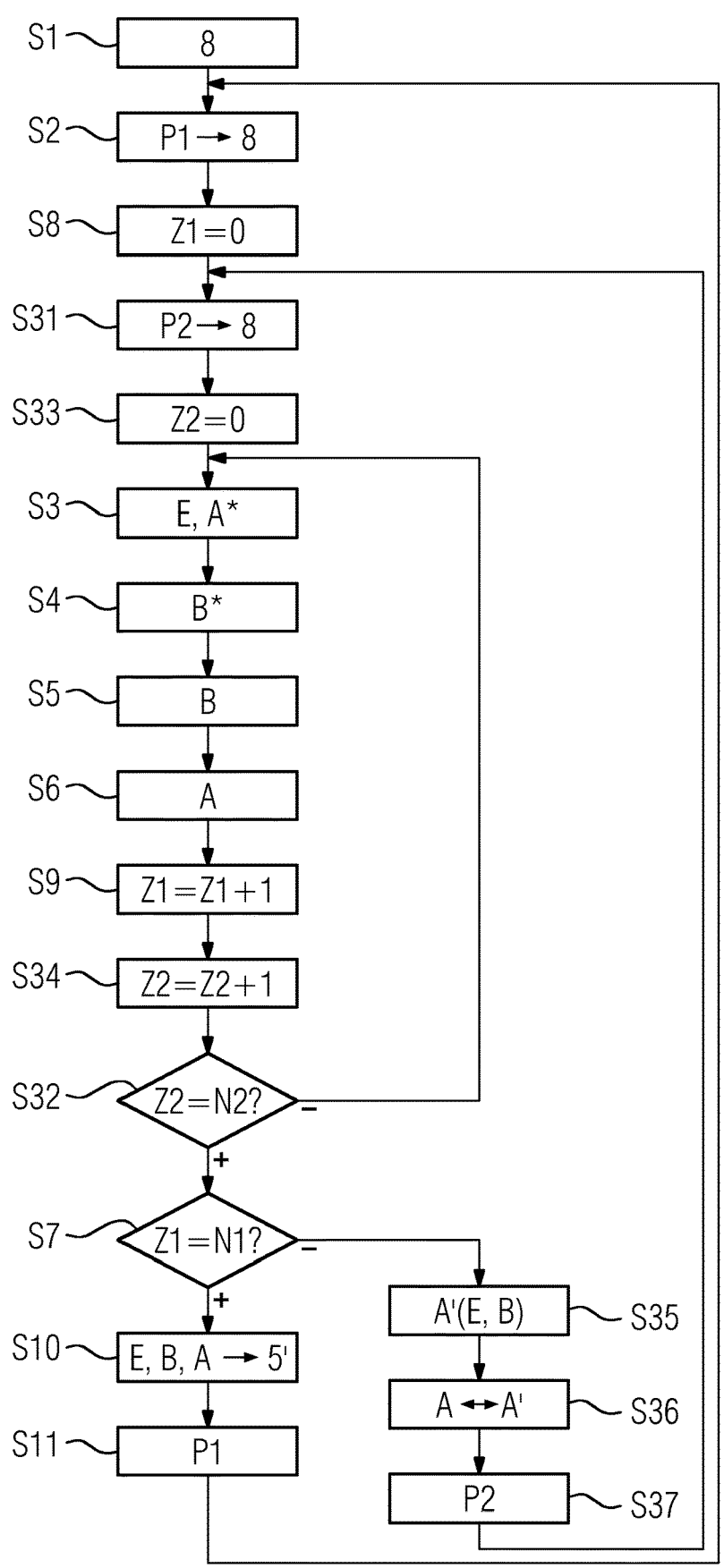
FIG. 5 shows a flow chart.

In one preferred embodiment of the present invention, additional steps S31 to S37 are provided in accordance with the illustration in FIG. 5. In this case, the model 8 is parameterized by the control unit 5 in step S31—in addition to the parameterization using the first model parameters P1, which is performed in step S2—using second model parameters P2. Furthermore, in this case the control unit 5 checks in step S32 whether it has passed through steps S3 to S6 sufficiently often to carry out a re-parameterization of the model 8 using the second model parameters P2.

For example, the control unit 5, in step S33, which is executed before step S3—if necessary, but after step S8—can set a counter Z2 to a starting value (for example, 0) and can increase the counter Z2 by 1 in a step S34 after each pass through steps S3 to S6. In this case, the control unit 5 can check in step S32 whether the counter Z2 has reached an end value N2. The end value N2 is suitably determined. In any case, it is less than the end value N1. It can even be substantially smaller than the end value N1. The end value N1 is preferably divisible by the end value N2.

If the corresponding group of output products 1, for example defined by the end value N2, has not yet been produced, the control unit 5 goes back to step S3. A further output product 1 is thus produced. In contrast, if the corresponding group of output products 1 has been produced, the control unit 5 passes over to step S35. In step S35, the control unit 5 ascertains—similarly to step S22—expected variables A' for the respective output products 1. The control unit 5 executes step S35 for all output products 1 of the respective group, i.e., for example, for the N2 output products 1.

In a step S36, the control unit 5 compares the actual variables A and the expected variables A' ascertained in step S35 for the corresponding group of output products 1. On the basis of the comparison, the control unit 5 ascertains, in a step S37, optimized second model parameters P2. The control unit 5 thus ascertains the second model parameters P2 in such a way that a better correspondence of the expected variables A' to the actual variables A results. The control unit 5 then goes back to step S31. The control unit 5 thus re-parameterizes the model 8 in accordance with the new values of the second model parameters P2 upon the renewed execution of step S31. The first model parameters P1 are not changed in the scope of steps S31 to S37, however. A further group of output products 1 is then again produced in the facility of the raw material industry. A renewed re-ascertainment of the second model parameters P2 and a renewed parameterization of the model 8 then take place. The last ascertained second model parameters P2 are also always used here by the control unit 5 for parameterizing the model 8.

Iterative processing of steps S35 to S37 is possibly required to ascertain the optimized second model parameters P2—similarly to the ascertainment of the optimized first model parameters P1. However, this is of subordinate significance in the scope of the present invention and is therefore not explained in greater detail hereafter.

According to the above-explained procedure of FIG. 5, the optimization of the second model parameters P2 is performed by the control unit 5. However, it is also possible that the optimization of the second model parameters P2 is performed by the processing unit 5' or another processing unit (not shown in the figures). In this case, a corresponding communication has to take place between the control unit 5 and the processing unit 5' or the further processing unit.

The end value N1 defines a plurality of output products 1 in each case. The end value N2 defines a group of output products 1 in each case. The end value N1 is, as already mentioned, always greater than 1. The end value N2 can also be greater than 1. However, it can also have the value 1 itself. In this case, steps S32 to S34 can be omitted.

Figure 6:
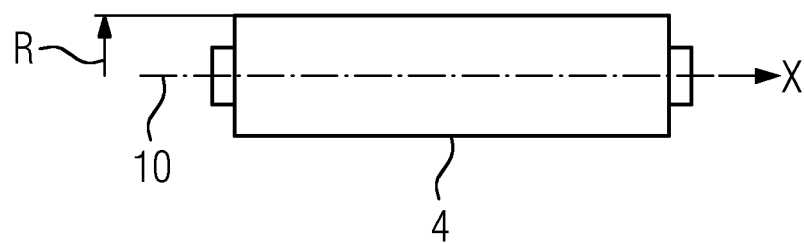
FIG. 6 shows a roller in section.

In many cases, the grind S is defined by a few parameters, which describe the curve of the diameter or the radius R of the roller 4—shown by way of example in FIG. 6—as a function via the position X in the direction of the roller axis 10. One example of such a grind is the SmartCrown grind generally known in technical circles. In some cases, however, it can be advantageous if the first model parameters P1 for describing the grind S of the roller 4 comprise the radius R or the diameter of the roller 4 at the position X of the respective support point for a plurality of support points along the roller crown of the roller 4. It is possible in particular by this embodiment to also optimize the grind S if the actual grind S of the roller 4 has a different functional relationship than specified by a target grind S*, according to which the roller 4 is supposed to have been ground by a respective grinding machine 11 schematically indicated in FIG. 5.

Figure 7:
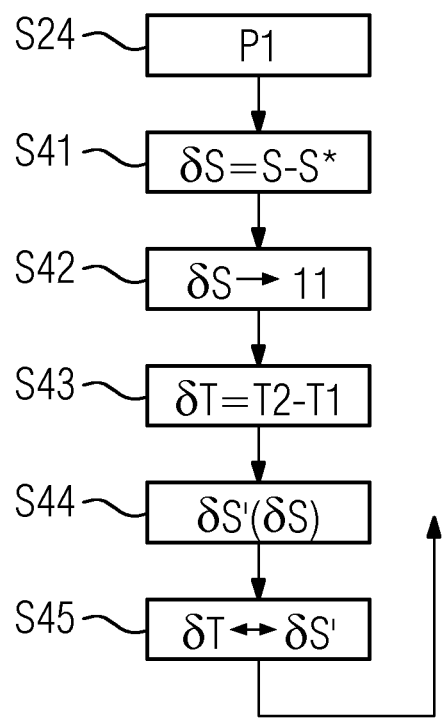
FIG. 7 shows a flow chart.

In particular, it is possible in this case to follow step S24 with steps S41 and S42 in accordance with the illustration in FIG. 7. In step S41, the processing unit 5' ascertains a deviation δS of the grind S of the roller 4 from the target grind S* of the roller 4. In step S42, the processing unit 5 5' associates the deviation δS with the respective grinding machine 11, i.e., the grinding machine 11 by which the grind S was applied to the roller 4. Furthermore, it is possible in this case to acquire the actual grind S already during the grinding of the roller 4 by means of the grinding machine 11 and to use it in the scope of the initial parameterization of the model 8. If the actual grind S can be acquired by the grinding machine 11 and a corresponding data coupling of the grinding machine 11 to the control unit 5 and/or the processing unit 5' exists, the specification of the first model parameters P1 describing the grind S can also be performed automatically, so that a later correction is not required or is only still required to a minor extent.

Alternatively or additionally, it is possible to acquire a first point in time T1 and a second point in time T2. The first point in time T1 is the point in time at which the corresponding roller 4 was removed from the rolling stand 3 (or another rolling stand 3) before the grinding. The second point in time T2 is the point in time at which the corresponding roller 4 was ground in the grinding machine 11. In this case, it is possible in accordance with the illustration in FIG. 7, for example, in a step S43, to ascertain the difference δT of the two points in time T1, T2 and thus the time which has passed between the removal of the roller 4 from the rolling stand 3 and the grinding of the roller 4 by means of the grinding machine 11. In this case, in a step S44, a thermal grinding error δS' can be ascertained on the basis of the deviation δS, which is associated in a step S45 with said time δT.

As explained up to this point, the first model parameters P1 (and possibly also the second model parameters P2) are adjusted and adapted in a model-assisted manner; however, the adjustment and adaptation always takes place, i.e., independently of which type the input products 2 and/or the output products 1 are. However, it is also possible that multiple sets of first model parameters P1 (and possibly also of second model parameters P2) are provided in the control unit 5, and the model 8 is parameterized in each case in dependence on input variables E of the input products 2 and/or on target output variables A* of the output products 1. In this case, on the one hand, the respective set of first model parameters P1 (and possibly also of second model parameters P2) is selected by the control unit 5 depending on the input variables E and/or the target output variables A*. On the other hand, the optimization of the first model parameters P1 (and possibly also the second model parameters P2) also takes place in each case only within the respective set of parameters P1, P2.

The present invention has many advantages. Thus, in particular model parameters P1 of the model 8 can be optimized by the procedure according to the invention, which could not be optimized at all by the conventional procedure. Specifically, in the rolling of a flat rolling stock, the rolling of the flat rolling stock can thus be modeled better, so that in particular an improved profile P, an improved contour K, and possibly also an improved planarity F can be achieved. The procedure according to the invention is robust and reliably results in exact modeling of the facility of the raw material industry.

Although the invention was illustrated in greater detail and described by the preferred exemplary embodiment, the invention is not thus restricted by the disclosed examples and other variants can be derived therefrom by a person skilled in the art without leaving the scope of protection of the invention.

LIST OF REFERENCE SIGNS 1 output products
2 input products
3 rolling stands
4 working rollers
5 control unit
5' processing unit
6 computer program
7 machine code
8 model
9 optimizer
10 roller axis
11 grinding machine
A actual variables
A' expected variables
A* target output variables
B actual modes
B* target modes
b width
E input variables
EM modulus of elasticity
F, F* planarities
K, K* contours
N1, N2 end values
P1, P2 model parameters
P, P* profiles
R radius
S, S* grind
S1 to S45 steps
TC parameters for influence on the contour of the roller caused by the temperature
T1, T2 points in time
WC parameters for influence on the contour of the roller caused by wear
X position in the direction of the roller axis
x position in the width direction of a flat rolling stock
x' distance
y thickness
Z1, Z2 counter
δS deviation
δS' thermal grinding error
δT time

The invention claimed is:
1. An optimization method for a model
wherein the model is based on mathematical-physical equations and models the production of output products from at least one input product supplied in each case to a facility of a raw material industry dependent on a mode (B) of the facility of the raw material industry;
controlling the facility of the raw material industry during the production of the output products by a control unit such that a respective actual mode (B) of the facility of the raw material industry corresponds to a respective target mode (B*) of the facility of the raw material industry;

ascertaining the target mode (B*) by the control unit using the model of the facility of the raw material industry;
parameterizing the model for modeling the facility of the raw material industry in accordance with a number of first model parameters (P1);
in each case after the production of a plurality of the output products, actual variables (A) of each of the output products of the plurality of the output products are compared to expected variables (A') of the plurality of the output products, re-ascertaining the first model parameters (P1) on the basis of the comparison, and re-parameterizing the model of the control unit in accordance with the new values of the first model parameters (P1) and ascertaining the target mode (B*) by the control unit from this point in time using the re-parameterized model of the facility of the raw material industry;
wherein the expected variables (A') are ascertained by means of the model; and
wherein the ascertainment of the expected variables (A') is based on the actual mode (B) of the facility of the raw material industry.

2. The optimization method as claimed in claim 1, further comprising implementing an optimizer by supplying input variables (E) describing the input products, the actual mode (B) of the facility of the raw material industry, and the actual variables (A) in each case to the optimizer for the re-ascertainment of the first model parameters (P1) for the plurality of the output products, and ascertaining the first model parameters (P1) by the optimizer.

3. The optimization method as claimed in claim 1, wherein
the plurality of the output products comprises multiple groups of the output products; and the method further comprises,
in each case after the production of one of the groups of the output products from the multiple groups of output products, comparing the actual variables (A) of the output products of the respective group to expected variables (A') of the output products of the respective group, re-ascertaining a number of second model parameters (P2) on the basis of the comparison, and re-parameterizing the model in accordance with the new values of the second model parameters (P2).

4. The optimization method as claimed in claim 3, wherein each group of the output products from the multiple groups of output products is equal to one output product.

5. The optimization method as claimed in claim 1, wherein the facility of the raw material industry is a rolling mill, and the production of the output product is the rolling of a flat rolling stock, and the actual variables (A) of the plurality of the output products comprise the profile (P) and/or the contour (K) and/or the planarity (F) of the rolled flat rolling stock.

6. The optimization method as claimed in claim 5, wherein the first model parameters (P1), with respect to at least one roller of a rolling stand through which the flat rolling stock passes, comprise the at least one roller's modulus of elasticity (EM) and/or the at least one roller's influence (TC, WC) caused by the temperature and/or by wear on the contour (K) of the at least one roller and/or, with respect to at least one rolling stand through which the flat rolling stock passes, comprise parameters for a material flow model, by means of which the material flow of the flat rolling stock in the rolling stand is modeled, and/or describe an adaptation of input variables (E) of the flat rolling stock.

7. The optimization method as claimed in claim 5, wherein the actual variables (A) of the plurality of the output products comprise the profile (P) and/or the contour (K) and/or the planarity (F) of the rolled flat rolling stock, and the first model parameters (P1), with respect to at least one roller of a rolling stand through which the flat rolling stock passes, comprise the at least one roller's grind (S).

8. The optimization method as claimed in claim 7, wherein the first model parameters (P1) for describing the grind (S) of the roller comprise radius (R) or diameter of the roller at the position of the respective support point for a plurality of support points along the roller crown of the roller.

9. The optimization method as claimed in claim 7, further comprising ascertaining a deviation (δS) of the grind (S) of the roller from a target grind (S*) of the roller, and the deviation (δS) of the grind (S) from the target grind (S*) is associated with a respective grinding machine, by which the grind (S) was applied to the roller.

10. The optimization method as claimed in claim 7, wherein evaluating a time (δT) which has passed between a removal of the roller from the rolling stand and the grinding of the roller by means of the grinding machine, and ascertaining a thermal grinding error (δS') associated with the time (δT).

11. A processing unit, programmed using a computer program stored on a non-transitory recording medium, wherein
the program comprises machine code processable by a processing unit configured to execute an optimization method as claimed in claim 1, wherein the processing of the machine code by the processing unit has the effect that the processing unit:
accepts actual variables (A) of the plurality of the output products, which were produced by the facility of the raw material industry from the input product in each case, by input variables (E) of the input product, and by the actual modes (B) of the facility of the raw material industry during the production of the plurality of the output products from the input product from the control unit controlling the facility of the raw material industry;
using input variables (E) of the input product and the actual mode (B) of the facility of the raw material industry, ascertains expected variables (A') in each case for the output products by means of a model based on mathematical-physical equations and modeling the production of the output product from the input product depending on the respective actual mode (B) of the facility of the raw material industry;
after the production of the plurality of the output products, compares the actual variables (A) of the plurality of the output products to the expected variables (A') of the plurality of the output products and re-ascertains first model parameters (P1) on the basis of the comparison; and
provides the re-ascertained first model parameters (P1) to a control unit controlling the facility of the raw material industry for parameterizing a model implemented in the control unit.

12. The processing unit as claimed in claim 11, wherein the plurality of output products comprises multiple groups of output products, and the computer program is designed such that the processing of the machine code by the processing unit has the effect that the processing unit implements the additional steps of:
in each case after the production of one of the groups of the output products, comparing the actual variables (A)

of the output products of the one of the groups expected variables (A') of the output products of the one of the groups, re-ascertaining a number of second model parameters (P2) on the basis of the comparison, and re-parameterizing the model in accordance with the new values of the second model parameters (P2).

13. A facility of a raw material industry for producing an output product from the input product supplied in each case to the facility of the raw material industry,
   associating a control unit configured for setting an actual mode (B) of the facility of the raw material industry with the facility of the raw material industry for controlling the facility of the raw material industry,
   wherein the control unit comprises a model of the facility of the raw material industry based on mathematical-physical equations, with the use of the equations, the control unit ascertains a target mode (B*) of the facility of the raw material industry,
   wherein the model models the production of respective the output product from the input product supplied in each case to a facility of the raw material industry depending on a mode (B) of the facility of the raw material industry,
   wherein the model for modeling the facility of the raw material industry is configured to be parameterized in accordance with a number of first model parameters (P1),
   wherein the control unit controls the facility of the raw material industry during the production of the output product in such a way that a respective actual mode (B) of the facility of the raw material industry corresponds to the respective target mode (B*) of the facility of the raw material industry,
   wherein the control unit is configured as a processing unit as claimed in claim 12, which has a data connection to the control unit, which is provided in addition to the control unit.

14. The facility of the raw material industry as claimed in claim 13, wherein the facility of the raw material industry is a rolling mill, and the production of the output product (1) is the rolling of a flat rolling stock.

15. A facility of a raw material industry for producing an output product from an input product supplied in each case to the facility of the raw material industry,
   associating a control unit configured for setting an actual mode (B) of the facility of the raw material industry with the facility of the raw material industry for controlling the facility of the raw material industry;
   wherein the control unit comprises a model of the facility of the raw material industry based on mathematical-physical equations, with the use of the equations, the control unit ascertains a target mode (B*) of the facility of the raw material industry;
   wherein the model models the production of the output product from the input product supplied in each case to a facility of the raw material industry depending on a mode (B) of the facility of the raw material industry;
   wherein the model for modeling the facility of the raw material industry is configured to be parameterized in accordance with a number of first model parameters (P1);
   wherein the control unit controls the facility of the raw material industry during the production of the output product in such a way that a respective actual mode (B) of the facility of the raw material industry corresponds to the respective target mode (B*) of the facility of the raw material industry;
   wherein the control unit is configured as a processing unit as claimed in claim 11, which has a data connection to the control unit, which is provided in addition to the control unit.

16. A computer program stored on a non-transitory recording medium, wherein the program comprises machine code processable by a processing unit, wherein the processing of the machine code by the processing unit has the effect that the processing unit
   accepts actual variables (A) of a plurality of output products, which were produced by a facility of a raw material industry from an input product in each case, input variables (E) of the input product, and an actual mode (B) of the facility of the raw material industry during the production of each of the output products from a control unit controlling a facility of the raw material industry;
   using the input variables (E) and the actual modes (B), the processing unit ascertains expected variables (A') for each output product by means of a model based on mathematical-physical equations and modeling the production of the output product from the input product depending on the actual mode (B) of the facility of the raw material industry;
   after the production of the plurality of the output products, compares the actual variables (A) of the output products of the plurality of the output products to the expected variables (A') of the plurality of the output products and re-ascertains first model parameters (P1) on the basis of the comparison; and
   provides the re-ascertained first model parameters (P1) to a control unit controlling the facility of the raw material industry for parameterizing a model implemented in the control unit.

17. The computer program as claimed in claim 16, wherein the processing of the machine code by the processing unit has the effect that the processing unit implements an optimization method, the method comprising:
   controlling the facility of the raw material industry during the production of the output products by a control unit such that the actual mode (B) of the facility of the raw material industry corresponds to a respective target mode (B*) of the facility of the raw material industry;
   ascertaining the target mode (B*) by the control unit using the model of the facility of the raw material industry;
   parameterizing the model for modeling the facility of the raw material industry in accordance with a number of first model parameters (P1);
   in each case after the production of the plurality of the output products, the actual variables (A) of the plurality of the output products are compared to the expected variables (A') of the plurality of the output products, re-ascertaining the first model parameters (P1) on the basis of the comparison, and re-parameterizing the model of the control unit in accordance with the new values of the first model parameters (P1) and ascertaining the target mode (B*) by the control unit from this point in time using the re-parameterized model of the facility of the raw material industry;
   wherein the expected variables (A') are ascertained by means of the model;
   wherein the ascertainment of the expected variables (A') is based on the actual mode (B) of the facility of the raw material industry; and
   implementing an optimizer by supplying input variables (E) describing the input products, the actual mode (B) of the facility of the raw material industry, and the actual variables (A) in each case to the optimizer for re-ascertainment of the first model parameters (P1) for the plurality of the output products, and ascertaining the first model parameters (P1) by the optimizer.

18. The computer program as claimed in claim 16, wherein the processing of the machine code by the processing unit has the effect that the processing unit implements the additional steps of implementing an optimizer by supplying input variables (E) describing the input products, the actual mode (B) of the facility of the raw material industry, and the actual variables (A) in each case to the optimizer for the re-ascertainment of the first model parameters (P1) for the respective plurality of output products, and ascertaining the first model parameters (P1) by the optimizer.

* * * * *